P. W. FOSTER.
TUBE EXPANDER.
APPLICATION FILED JULY 14, 1917.
1,273,475.
Patented July 23, 1918.
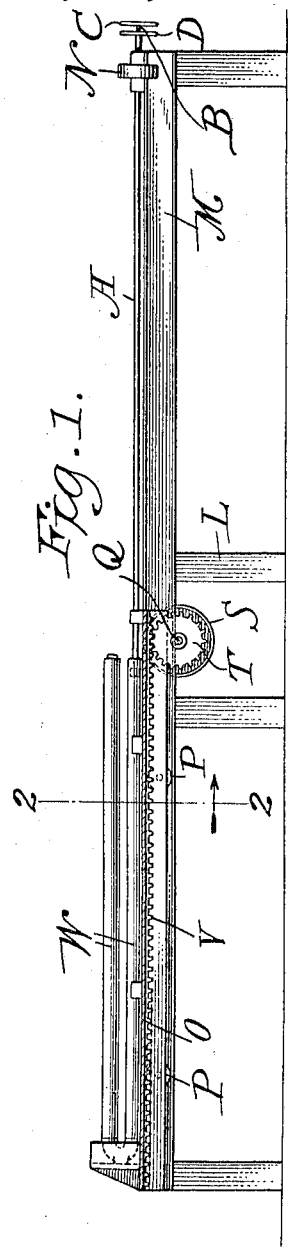
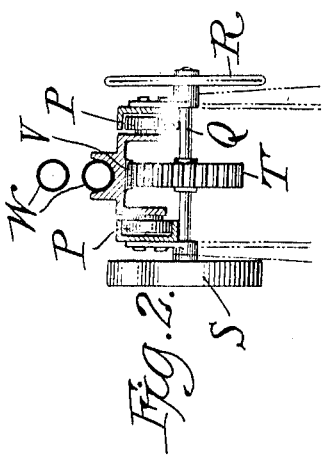
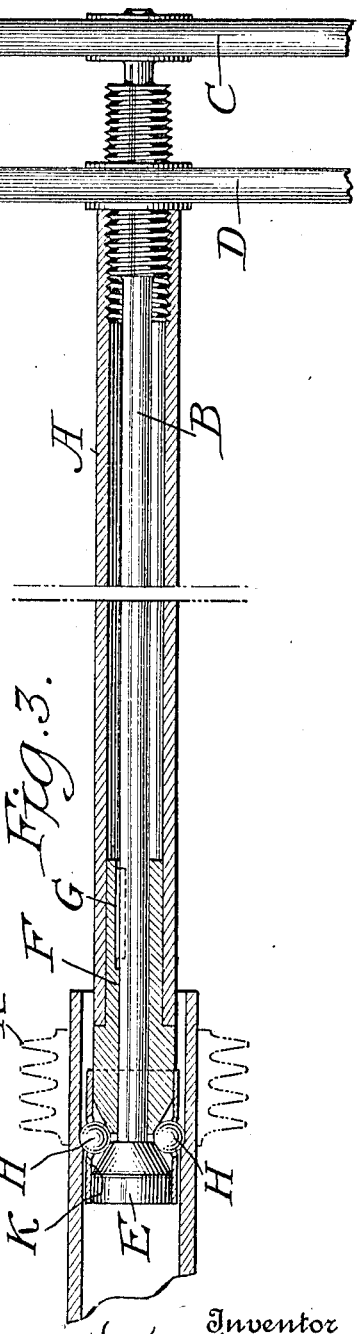
Inventor
␣␣␣Pess W. Foster
By his Attorneys

UNITED STATES PATENT OFFICE.

PELL W. FOSTER, OF NEW YORK, N. Y., ASSIGNOR TO POWER SPECIALTY COMPANY, OF NEW YORK, N. Y., A CORPORATION OF NEW YORK.

TUBE-EXPANDER.

1,273,475.        Specification of Letters Patent.      Patented July 23, 1918.

Application filed July 14, 1917. Serial No. 180,498.

*To all whom it may concern:*

Be it known that I, PELL W. FOSTER, a citizen of the United States, residing at New York, in the county and State of New York, have invented certain new and useful Improvements in Tube-Expanders, of which the following is a full, clear, and exact description.

In certain forms of apparatus, of which the tubes of a superheater may serve as an illustrative example, wrought iron tubes are surrounded by cast iron rings which should be tight fitting and to all intents and purposes integral with the tubes. This is but one of a number of instances where a tubular metal body is surrounded by or enveloped in another with a close and perfect joint, and various forms of expanders have been devised for enlarging the tube and forcing it into close union or contact with its envelop.

An improved device of this character, and a new method of expanding the inner and firmly and perfectly uniting the same to the surrounding member in such a device as a superheater tube of the kind referred to constitute the invention subject of this application for Letters Patent.

I select for illustrating the invention a steam superheater, as that is typical of the object treated and purpose to be accomplished, but it will be understood that in this regard the invention is not limited, but may be employed under all similar circumstances and conditions.

Where cast iron rings or cylinders, generally corrugated, are fitted over the wrought iron tubes of a superheater, it has heretofore been customary to machine the rings, and to expand and shrink them over the tubes so as to secure a perfect and tight-fitting joint on cooling. As this is a somewhat tedious process, it has been proposed to place the rings over a tube and to then expand the latter by pneumatic pressure into close union with them, but this method is not without its drawbacks since the tube must be expanded to or beyond its elastic limit in order to remain in its expanded state after the internal pressure is withdrawn.

I have found however that the tube may be mechanically and progressively expanded by a suitable tool into close and permanent union with the rings, very much more rapidly and economically than by any other method heretofore practised, and to this end I have devised an expander having a series of steel balls working on a two-part race which is capable of radial adjustment and so devised that the balls tend to follow a spiral path of low pitch when the tool is introduced into a tube surrounded by a series of rings and expand the latter into perfect union therewith, the spiral path which the balls tend to follow being in the direction of the movement of the tool through the tube, thus facilitating the feed movement.

This device and its manner of use are illustrated in the accompanying drawing, in which—

Figure 1 is a side view in elevation of the expander showing its method of use,

Fig. 2 is a cross section on the line 2—2 of Fig. 1, and

Fig. 3 is a longitudinal section on an enlarged scale of the expander.

The tool proper comprises a tubular stem A, threaded internally at one end and inclosing a rod B, carrying an adjusting hand wheel C, and threaded to engage with the tube. D is a locking wheel for firmly securing the rod in any position to which it may be adjusted.

The forward end of rod B is provided with a conical portion E and is surrounded by a steel sleeve F to which it is secured by a spline G and which is formed with a tapered end to constitute with the conical end a race for a series of steel balls H. The angle of the end of the sleeve, which in this instance is the rear member of the race relatively to the direction of the movement of the tool through the tube, is slightly less than that of the other member of the ball race, so that when the race as a whole is rotated the balls will have a tendency to follow a spiral path in the direction of the movement of the tool through the tube.

The balls are retained in position by a cylindrical cover K, which is slidably secured to the tube A and provided with apertures through which the balls project.

By the adjustment of the rod B, the conical members are moved to raise or lower the ball track and thus vary the distance of the balls from the center of rotation and effect more or less expansion as circumstances may determine.

In using the tool it is mounted in a frame L on a table M, and provided with a pulley N, by which it may be rapidly rotated. In line with this table is another, O, having a track for two or more carriages P, and a shaft Q provided with a hand wheel R, a driving pulley S and a gear wheel T which meshes with a rack V to which the carriages are secured.

A superheater tube W is mounted on the carriages and a series of rings or short corrugated cylinders X of cast iron are strung over it. It is then brought up over the expander and gradually advanced while the latter is rotating, with the result that the balls following a spiral line around the inner surface of the tube expand the latter, as indicated in Fig. 3, into close and intimate union with the rings.

The construction of the expander may be varied, but when constructed as shown and described it seems to answer the purpose better than any that I have tried. It will be observed that the tube is progressively expanded, in the true sense of the word, and when the balls have reached the end of their course the superheater tube may be quickly withdrawn by power applied to the driving wheel on the carriage.

What I claim is—

In a tube expanding machine the combination with a rotary stem of a central adjustable rod carrying one conical member of a ball race, a second conical member secured to the stem, the angle of the rear member, relatively to the direction of movement of the tool through the tube to be expanded, being less than that of the other member of the race, balls adapted to run on the members and a casing with apertures through which the balls project secured to the stem and confining the balls.

In testimony whereof I hereunto affix my signature.

PELL W. FOSTER.

Copies of this patent may be obtained for five cents each, by addressing the "Commissioner of Patents, Washington, D. C."